United States Patent Office 3,559,482
Patented Feb. 2, 1971

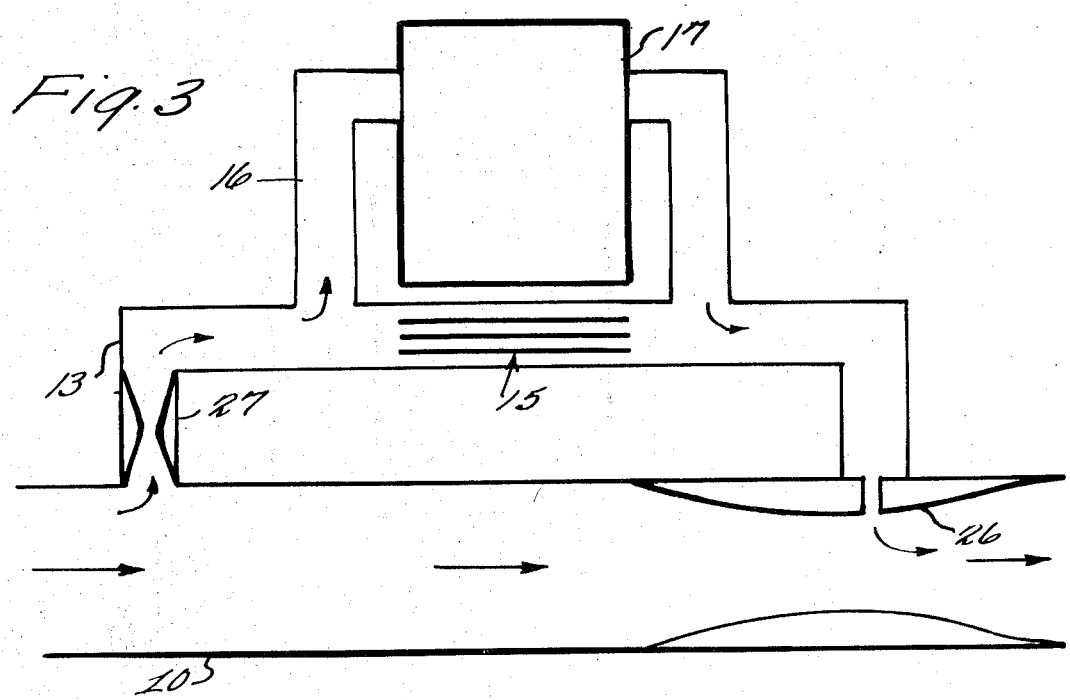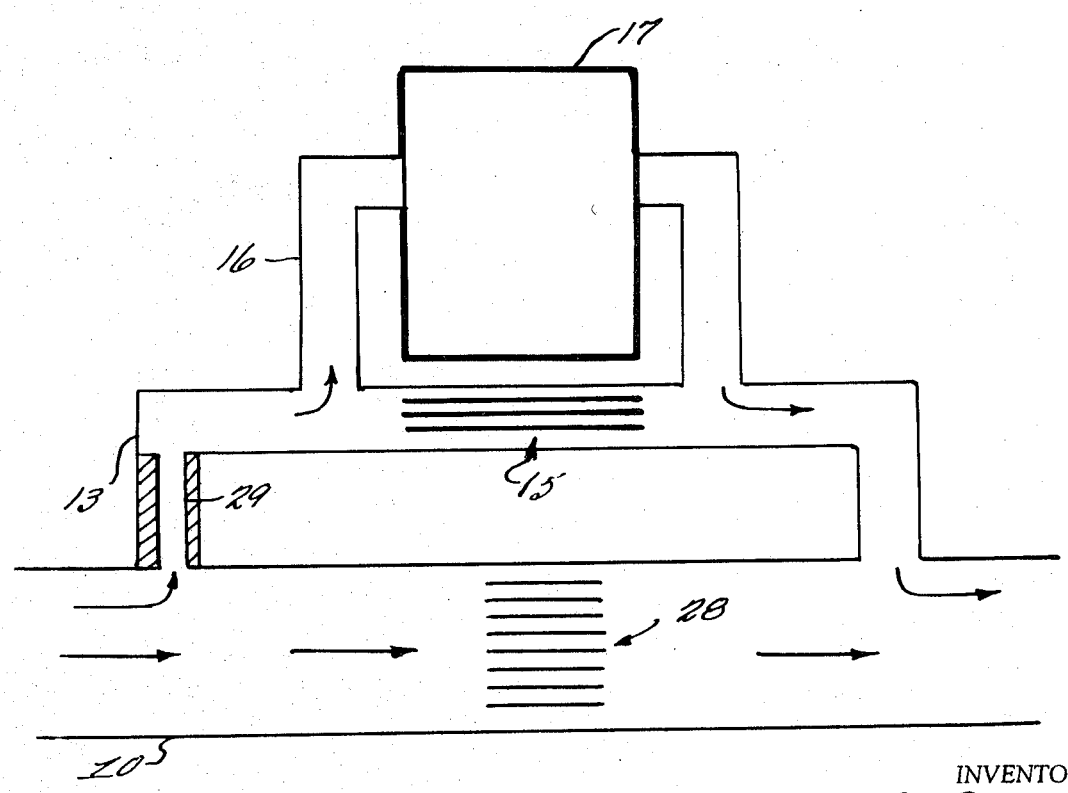

3,559,482
FLUID FLOW MEASURING APPARATUS
William C. Baker, James M. Benson, and Edmond Easter, Hampton, Va., assignors to Teledyne Incorporated, Los Angeles, Calif., a corporation of California
Filed Nov. 27, 1968, Ser. No. 779,579
Int. Cl. G01p 5/10
U.S. Cl. 73—204
20 Claims

ABSTRACT OF THE DISCLOSURE

Apparatus for measuring the flow of fluid through a main supply line by the use of a first shunt fluid flow path across a first restrictive element in the main line. The first shunt path includes second and third restrictive elements. A second shunt fluid flow path is connected across the third restrictive element in the first shunt path. The second shunt path includes a conduit at least a portion of which is electrically and thermally conductive, the conductive portion having one or more thermoelectric devices positioned therealong. Heating current is passed through the conductive conduit portion, and the temperature gradient caused by fluid flow through the heated conduit is sensed by the thermoelectric devices to provide an indication of mass flow in the main line substantially independently of pressure and temperature.

---

The present invention is directed to apparatus known as shunt flowmeters for measuring the flow of fluid through a main supply line. Typically, such flowmeters employ a restrictive element in the main line which develops a pressure drop across the element. This drop varies in accordance with the first or second power of the flow in the line depending on the element used. A head type element, such as an orifice plate, nozzle, pitot-static tube, venturi-shaped constriction or the like, develops a pressure drop which is proportional to the first power of fluid density and the square of the velocity of the fluid. A viscous type element, such as a laminar flow element, capillary or the like, develops a pressure drop which, in accordance with Poiseuille's law, is proportional to the fluid viscosity and the first power of the fluid density. A by-pass or shunt path, is connected across the head element to divert a fraction of the flow in the main line through a transducer. The fractional part of the flow in the shunt path is used to determine the total flow in the main supply line.

The transducers which have been employed in the past to sense flow in shunt lines suffer disadvantages which the present invention overcomes. More particularly, mechanical devices, such as rotameters, do not measure mass flow, and are relatively insensitive at low flow rates. Conventional electrical transducers of the so-called "hot-wire" type, which are introduced into the shunt path so as to be cooled by the shunted fluid to effect a flow measurement, are subject to damage from streaming debris in the path. In the case where the fluid is combustible, such transducers pose an ignition problem. Furthermore, "hot-wire" transducers are sensitive to the thermal conductivity of the fluid.

The present invention overcomes the foregoing deficiencies by providing improved combinations of a shunt type flowmeter and a transducer which: are sensitive to a wide range of fluid flow; are insensitive to variations in the fluid's thermal conductivity and viscosity; minimize ignition hazards; and measure mass flow of any one particular gas substantially independent of pressure and temperature.

In Pat. 3,443,434, dated May 13, 1969, by William C. Baker, James M. Benson and Charles E. Hawk, and entitled "Fluid Flow Measuring Apparatus," there is disclosed a flow measuring device having a restrictive element in the main line to develop a differential pressure in the line. A shunt path is connected to the main supply line so as to divert a portion of the fluid through the shunt from the high pressure side of the restrictive element to the low pressure side. A thermal flowmeter is connected in the shunt path, the flowmeter including a thermally and electrically conductive section of conduit having first and second ends coupled to a heat sink, and one or more thermoelectric devices positioned along the conduit. When heating current is passed through the conductive conduit section, the thermoelectric voltages generated by these devices are used to indicate flow characteristics.

The thermal flowmeters used in the flow measuring apparatus disclosed in Pat. 3,443,434 are described in detail in United States Pats. Nos. 3,181,357 and 3,229,522, issued respectively on May 4, 1965 and Jan. 18, 1966 to James M. Benson. Such thermal flowmeters are very practical in the measurement of the mass flow of fluids in general and compressible gases in particular. One major advantage of such flowmeters is the low power required to operate the device, typically less than 10 watts. The flowmeter is, however, limited as to the amount of fluid it can measure directly with such an input of power. A typical maximum flowrate of air is 1 standard liter per minute.

It is a principal object of this invention to extend the range of use of thermal flowmeters of the type disclosed in Pats. Nos. 3,181,357 and 3,229,522 in fluid flow measuring apparatus without large increases in the power required by the thermal flowmeters. This is accomplished by placing a first restrictive element in a main supply line and connecting a first shunt path containing second and third restrictive elements across the first restrictive element. A second shunt path is then connected across the third restrictive element in the first shunt path. The second shunt path includes a thermal flowmeter of the type disclosed in Pats. Nos. 3,181,357 and 3,229,522. More particularly, the second shunt path includes a conduit at least a portion of which is electrically and thermally conductive, the conductive portion having one or more thermoelectric devices positioned therealong. Heating current is passed through the conductive conduit portion, and the temperature gradient caused by fluid flow through the heated conduit is sensed by the thermoelectric devices to provide an indication of mass flow in the second shunt path substantially independently of pressure and temperature. The first and second restrictive elements form a first flow dividing network, the flow in the first shunt path being a small fraction of the total flow in the main line. The third restrictive element and the conduit in the thermal flowmeter form a second flow dividing network, the flow in the second shunt path being a small fraction of the flow in the first shunt path and hence, an even smaller fraction of the flow in the main line.

The invention will become more fully apparent when considered in light of the following detailed description of illustrated embodiments of the invention and from the appended claims.

The illustrative embodiments may be best understood by reference to the accompanying drawings, wherein:

FIG. 3 is a schematic drawing illustrating a third embodiment of the invention, the details of the thermal flowmeter being omitted for convenience of illustration.

FIG. 4 is a schematic drawing illustrating a fourth embodiment of the invention, the details of the thermal flowmeter being omitted for convenience of illustration;

Figure 1:
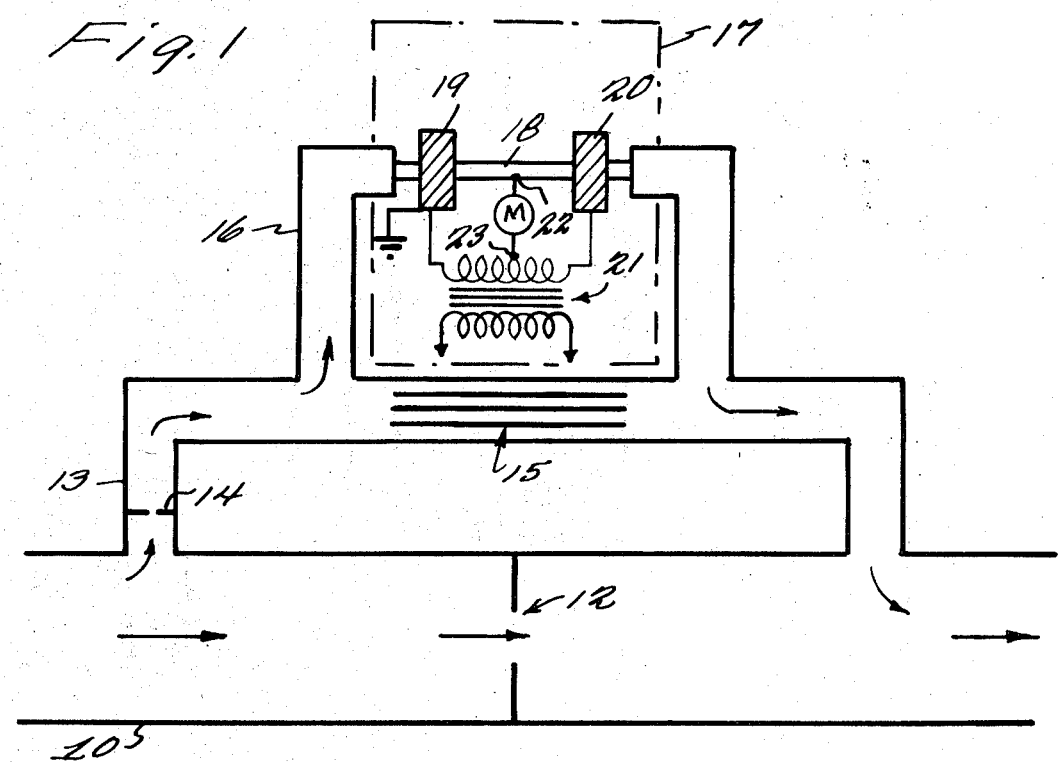
FIG. 1 is a schematic drawing, partially in section, illustrating a first embodiment of the invention.

Referring first to FIG. 1, a basic arrangement is illustrated for measuring the fluid flow in a main supply line, designated by the numeral 10, the fluid moving in a direction indicated by the arrowheads. A first restrictive element 12, in this case an orifice plate, is positioned in the main line to develop a pressure drop which is proportional to the first power of the fluid density and the square of the velocity of the fluid. The rstrictive element creates a pressure differential between opposite sides of the element.

A first shunt path 13 containing a similar second restrictive element 14 bridges the main line element 12 diverting a portion of the fluid streaming in the main line. The two orifice plates 12 and 14 divide the flow so that a relatively small fraction of the total flow is diverted through shunt path 13, the ratio being substantially independent of the total flow and depending in magnitude on the ratio of the areas of the two orifices in plates 12 and 14.

A third restrictive element 15 comprising a laminar flow element is also provided in the first shunt path 13. A second shunt path 16 containing a thermal mass flowmeter 17 bridges element 15 to divert a portion of the fluid streaming in the first shunt path 13. A capillary conduit section 18 is provided in shunt path 16. In the preferred embodiment of the invention, conduit 18 is a part of flowmeter 17. The passages through laminar element 15 are of approximately the same cross-sectional area and length as conduit section 18. This is to insure that the splitting ratio of flow between the first and second shunt paths remains substantially constant. Conduit section 18 is electrically and thermally conductive and is coupled at its ends to heat sinks 19 and 20. The heat sinks are characterized as masses of material which remain substantially at the ambient temperature of their surroundings, even when heating current is passed through the sinks and through conduit section 18. However, due to the fact that the conduit section is of lesser mass than the heat sinks, it is heated to a temperature above its ambient surroundings as current is passed therethrough. A transformer 21 is connected to heat sinks 19 and 20 to drive heating current through conduit section 18 when the transformer is energized. A thermoelectric device 22, such as a thermocouple, is located along conduit 18. The thermoelectric device is connected through a meter M to point 23 on the secondary winding of transformer 21. Assuming that the secondary winding is of the same material as the heat sinks to which the winding is connected at its ends, the meter M responds to the difference in temperature between the junction point of the thermoelectric device and the heat sinks. The temperature sensed by the thermoelectric device 22 is proportional to the flow in the conduit section 18. Therefore, with the knowledge of the splitting ratio between the main supply line 10 and the respective shunt paths 13 and 16, the meter M may be calibrated to indicate total mass flow of the fluid flow in the main line.

In considering the embodiment just described it is apparent that the first restrictive element 12 in the main line 10 and the second restrictive element 14 in the first shunt path 13 form a first flow divider network. The orifice plates 12 and 14 determine that the flow in the shunt path 13 varies linearly with the main line flow. The third restrictive element 15 in the first shunt path 13 and the conduit 18 of the flowmeter 17 in the second shunt path 16 from a second flow divider network. The laminar flow element 15 and capillary 18 result in the measured flow in path 16 varying linearly with that in shunt path 13. Thus, the thermal flowmeter 17 derives a signal that varies substantially linearly with flow in the main line 10.

By the foregoing arrangement of plural shunt paths the flow is divided so that the thermal flowmeter 17 can be used to measure mass flow of much greater magnitude than if it were part of a first shunt path as disclosed in the above identified Pat. No. 3,443,434. This compound shunt arrangement permits a shunt line orifice plate to be used which is of sufficient diameter so as to minimize the chance of its clogging with debris during operation. Another advantage of being able to use a shunt path orifice plate of a relatively large diameter is the avoidance of extremely small flow through the shunt path orifice at low flow rates during which the discharge coefficient of a small orifice may depart from a constant value. A constant coefficient of the orifice is essential to maintain a constant splitting ratio as between the main line 10 and shunt line 13.

Figure 2:
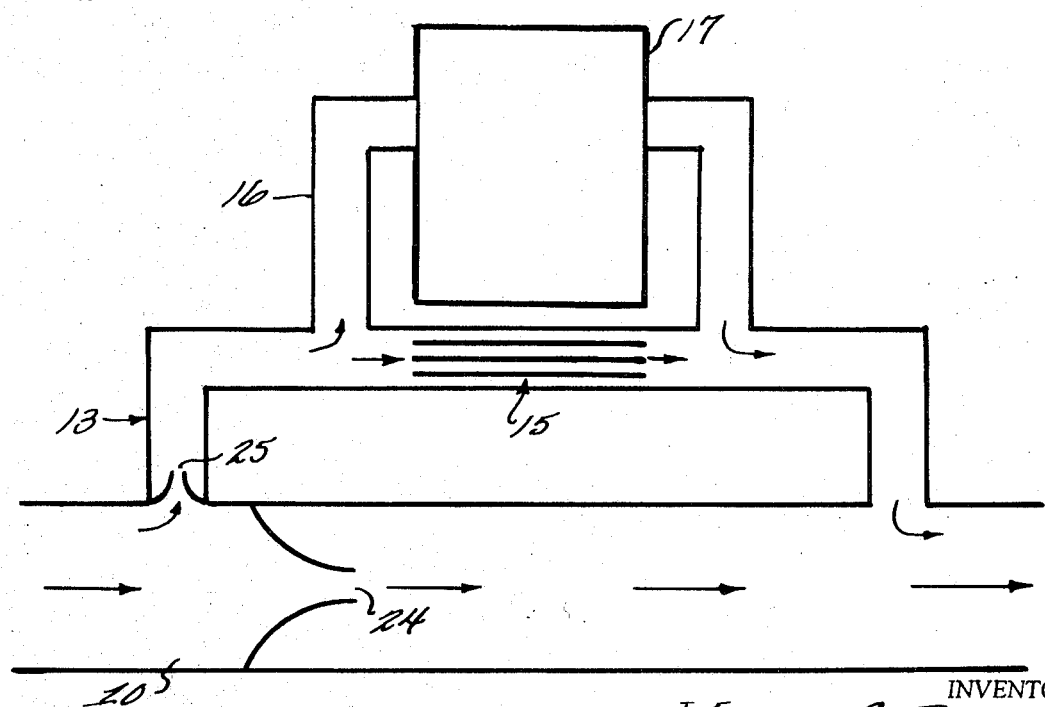
FIG. 2 is a schematic drawing illustrating a second embodiment of the invention, the details of the thermal flowmeter being omitted for convenience of illustration.

FIG. 2 illustrates a second apparatus for measuring mass flow of fluid streaming in a main supply line 10. This embodiment is identical to that shown in FIG. 1 except that shaped nozzles 24 and 25 are substituted for the orifice plates 12 and 14 of FIG. 1. For flow in certain ranges of Reynolds number, a nozzle has advantages in maintaining a constant discharge coefficient.

The arrangement of FIG. 3 is also identical to that of FIG. 1 except that venturi sections 26 and 27 are substituted for the orifice plates 12 and 14 of FIG. 1.

In the embodiment of FIG. 4 the orifice plates 12 and 14 of FIG. 1 are replaced by restrictive elements that depend primarily on viscous forces. More particularly, laminar flow element 28 is substituted for the orifice plate 12 of FIG. 1 and capillary 29 is employed rather than orifice plate 14. Each of the capillary passages of element 28 has approximately the same cross-sectional area and length as the capillary restriction 29 in the shunt path. This is to insure that small deviations from the idealized Poiseulle flow in each of the multiplicity of passages of the laminar flow element 28 will be practically the same as in the shunt path capillary 29 thereby resulting in a constant splitting ratio between the main line 10 and the first shunt path 13.

Figure 5:
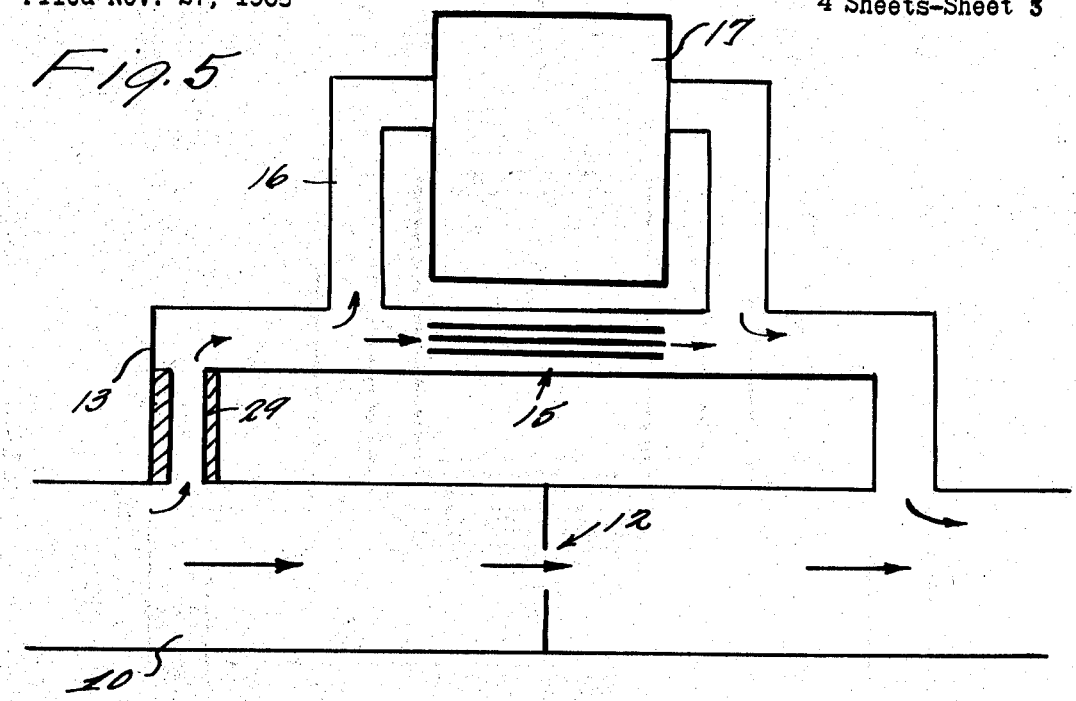
FIG. 5 is a schematic drawing illustrating a fifth embodiment of the invention, the details of the thermal flowmeter being omitted for convenience of illustration.

The arrangement shown in FIG. 5 is a further embodiment which is useful when it is desired to expand the sensitivity of the flowmeter at the higher rates of flow so that the electrical signal developed by the terminal flowmeter 17 varies directly as the square of the flow in the main line 10. In this case a capillary 29 is employed in shunt path 13 rather than the orifice 14 of the embodiment in FIG. 1. In the main line 10 the differential pressure across orifice plate 12 varies as the square of the volume flow rate, whereas the pressure drop in shunt path 13 across capillary 29 varies as the first power of the volume flow rate in path 13. Hence, the volume flow rate in the shunt path 16, and the thermoelectric signal developed by flowmeter 17, varies as the square of the volume flow rate in the main line 10. By using as meter M one of the many forms of commercially available instruments designed to accept a signal and to extract the square root thereof, a display of the linearized function of the main line flow is achieved.

Figure 6:
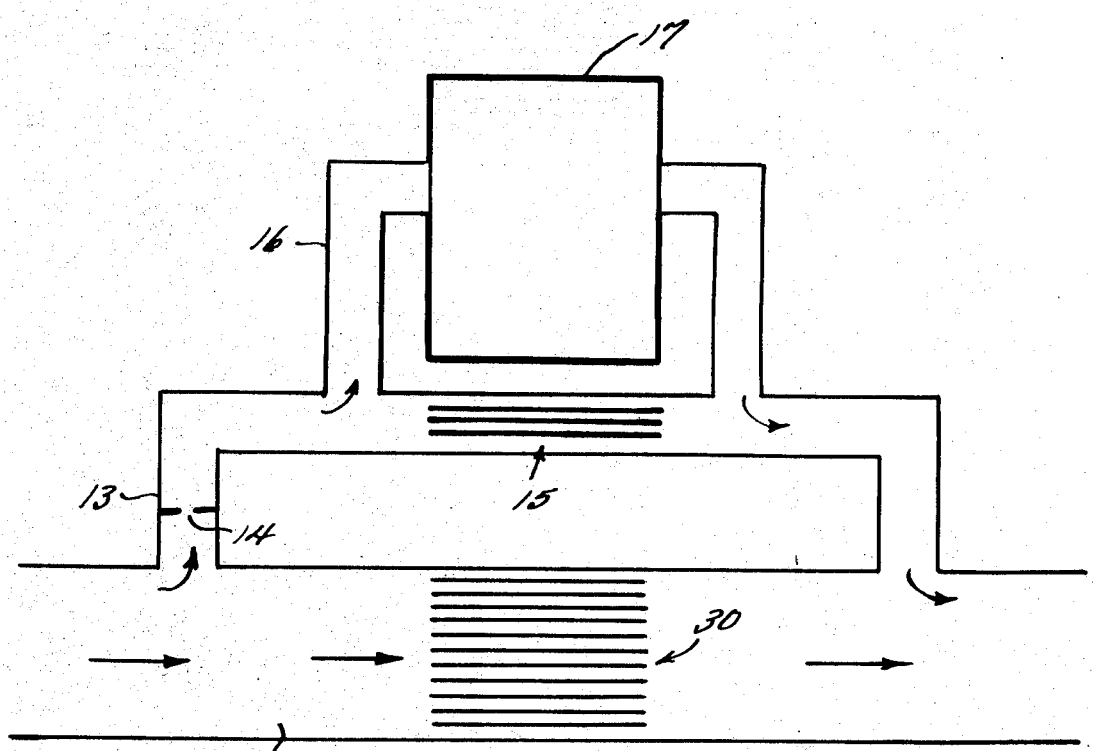
FIG. 6 is a schematic drawing illustrating a sixth embodment of the invention, the details of the thermal flowmeter being omitted for convenience of illustration.

The embodiment of FIG. 6 substitutes a laminar flow element 30 for the orifice plate 12 shown in FIG. 1. This produces a system that provides a high sensitivity at low flow rates with a large full-scale range. The differential pressure drop across element 30 varies as the volume flow rate in main line 10 resulting in the flow in the first shunt path 13 varying as the square root of the main flow. Again, by providing a meter M which registers the square of the signal applied thereto, a linearized function of main line flow is achieved.

Figure 7:
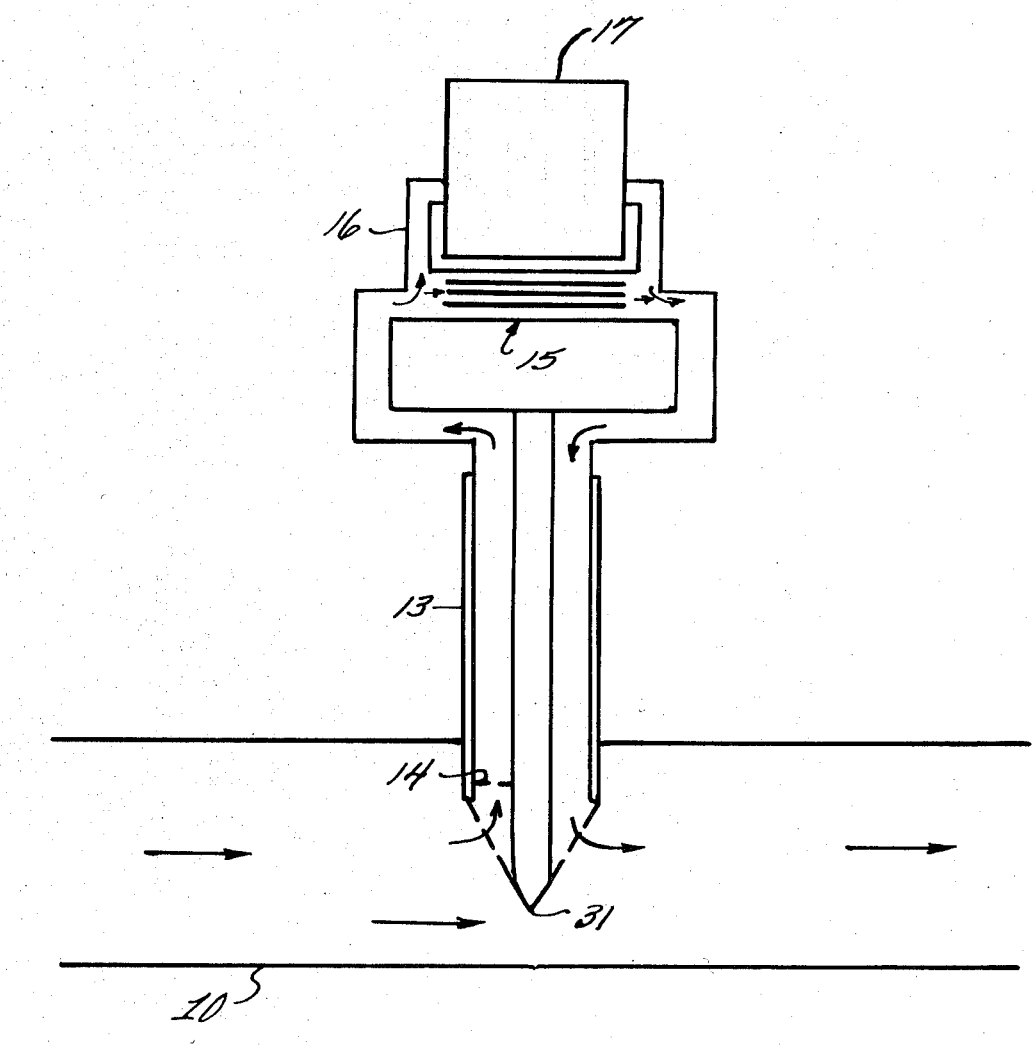
FIG. 7 is a schematic drawing illustrating a seventh embodiment of the invention, the details of the thermal flowmeter being omitted for convenience of illustration.

The arrangement shown in FIG. 7 is identical to that of FIG. 1 except that a pitot-tube 31 is substituted for orifice plate 12 in the main line 10.

The above-described embodiments are illustrative of preferred embodiments of the invention but are not intended to limit the possibilities of insuring the features of an extremely sensitive fluid flowmeter operable over an extended flow range. For given situations, different thermal flowmeters of the type disclosed in Pats. Nos. 3,181,357 and 3,229,522 could be substituted for that specifically illustrated and described herein. The arrangements presented hereinbefore are examples of apparatus in which the inventive features of this disclosure may be utilized, and it will become apparent to one skilled in the art that certain modifications may be made within the spirit of the invention as defined by the appended claims.

What is claimed is:

1. Apparatus for measuring fluid flow through a main supply line, comprising:
    (a) a first restrictive element within the main line for developing a differential pressure thereacross;
    (b) a first shunt path connected to the main line to divert fluid from the main line at the higher pressure side of the first restrictive element and to return the fluid to said main line at the lower pressure side of the first restrictive element;
    (c) a second restrictive element within the first shunt path for developing a differential pressure thereacross, said first and second restrictive elements forming a first flow divider network diverting a fraction of the main line flow through the first shunt path;
    (d) a third restrictive element within the first shunt path for developing a differential pressure thereacross;
    (e) a second shunt path connected to the first shunt path to divert fluid from the first shunt path at the higher pressure side of the third restrictive element and to return the fluid to said first shunt path at the lower pressure side of the third restrictive element;
    (f) a conduit within the second shunt path for developing a differential pressure thereacross, said conduit and the third restrictive element forming a second flow divider network diverting a fraction of the first shunt path flow through the second shunt path; and
    (g) a thermal flowmeter connected in said second shunt path, said flowmeter including:
        (1) a thermally and electrically conductive section to pass fluid diverted through said second shunt path;
        (2) means for electrically heating said conductive section; and
        (3) at least one thermoelectric device joined to said section and responsive to the temperature of its junction with the section to develop an output representative of fluid flow in the main line.

2. Apparatus for measuring fluid flow as set forth in claim 1 wherein said conduit is the thermally and electrically conductive section of the flowmeter.

3. Apparatus for measuring fluid flow as set forth in claim 2 wherein said first and second restrictive elements are head type elements.

4. Apparatus for measuring fluid flow as set forth in claim 2 wherein said conduit and the third restrictive element are viscous type elements.

5. Apparatus for measuring fluid flow as set forth in claim 2 wherein said first and second restrictive elements are head type elements, and said conduit and the third restrictive element are viscous type elements.

6. Apparatus for measuring fluid flow as set forth in claim 2 wherein said first and second restrictive elements are viscous type elements.

7. Apparatus for measuring fluid flow as set forth in claim 2 wherein said first and second restrictive elements are viscous type elements, and said conduit and the third restrictive element are viscous type elements.

8. Apparatus for measuring fluid flow as set forth in claim 2 wherein said first and second restrictive elements are head and viscous type elements, respectively.

9. Apparatus for measuring fluid flow as set forth in claim 2 wherein said first and second restrictive elements are head and viscous type elements, respectively, and said conduit and the third restrictive element are viscous type elements.

10. Apparatus for measuring fluid flow as set forth in claim 2 wherein said first and second restrictive elements are viscous and head type elements, respectively.

11. Apparatus for measuring fluid flow as set forth in claim 2 wherein said first and second restrictive elements are viscous and head type elements, respectively, and said conduit and the third restrictive element are viscous type elements.

12. Apparatus for measuring fluid flow as set forth in claim 1 wherein said first and second restrictive elements are head type elements.

13. Apparatus for measuring fluid flow as set forth in claim 12 wherein said conduit and the third restrictive element are viscous type elements.

14. Apparatus for measuring fluid flow as set forth in claim 1 wherein said conduit and the third restrictive element are viscous type elements.

15. Apparatus for measuring fluid flow as set forth in claim 1 wherein said first and second restrictive elements are viscous type elements.

16. Apparatus for measuring fluid flow as set forth in claim 15 wherein said conduit and the third restrictive elements are viscous type elements.

17. Apparatus for measuring fluid flow as set forth in claim 1 wherein said first and second restrictive elements are head and viscous type elements, respectively.

18. Apparatus for measuring fluid flow as set forth in claim 17 wherein said conduit and the third restrictive elements are viscous type elements.

19. Apparatus for measuring fluid flow as set forth in claim 1 wherein said first and second restrictive elements are viscous and head type elements, respectively.

20. Apparatus for measuring fluid flow as set forth in claim 19 wherein said conduit and the third restrictive elements are viscous type elements.

References Cited
UNITED STATES PATENTS

| | | | |
|---|---|---|---|
| 2,322,018 | 6/1943 | Huber | 73—202X |
| 2,586,060 | 2/1952 | Kronberger | 73—204 |
| 3,425,277 | 2/1969 | Adams | 73—204 |
| 3,443,434 | 5/1969 | Baker et al. | 73—202 |

CHARLES A. RUEHL, Primary Examiner

U.S. Cl. X.R.

73—202